(12) United States Patent
Marth et al.

(10) Patent No.: US 9,747,166 B2
(45) Date of Patent: Aug. 29, 2017

(54) SELF HEALING CLUSTER OF A CONTENT MANAGEMENT SYSTEM

(71) Applicant: Adobe Systems Incorporated, San Jose, CA (US)

(72) Inventors: Michael Marth, Basel (CH); Dominique Pfister, Basel (CH); Thomas Müller Graf, Herzogenbuchsee (CH); Marcel Reutegger, Wiesendangen (CH)

(73) Assignee: Adobe Systems Incorporated, San Jose, CA (US)

( * ) Notice: Subject to any disclaimer, the term of this patent is extended or adjusted under 35 U.S.C. 154(b) by 149 days.

(21) Appl. No.: 14/050,847

(22) Filed: Oct. 10, 2013

(65) Prior Publication Data
US 2015/0106327 A1 Apr. 16, 2015

(51) Int. Cl.
| | |
|---|---|
| *G06F 17/30* | (2006.01) |
| *G06F 11/14* | (2006.01) |
| *G06F 11/16* | (2006.01) |
| *G06F 11/20* | (2006.01) |
| *G06F 11/07* | (2006.01) |
| *H04L 29/08* | (2006.01) |
| *H04L 29/14* | (2006.01) |

(52) U.S. Cl.
CPC ...... *G06F 11/1425* (2013.01); *G06F 11/0709* (2013.01); *G06F 11/0793* (2013.01); *G06F 11/1658* (2013.01); *G06F 11/2094* (2013.01); *H04L 67/1095* (2013.01); *H04L 67/1097* (2013.01); *H04L 69/40* (2013.01); *G06F 11/2028* (2013.01); *G06F 11/2035* (2013.01); *G06F 11/2046* (2013.01)

(58) Field of Classification Search
CPC ......... G06F 17/30575; G06F 17/30286; G06F 17/30067
USPC .......... 707/610, 689, 10; 714/6, 57; 715/751
See application file for complete search history.

(56) References Cited

U.S. PATENT DOCUMENTS

| | | | |
|---|---|---|---|
| 5,822,512 A * | 10/1998 | Goodrum | G06F 11/142 714/13 |
| 6,324,544 B1 * | 11/2001 | Alam et al. | |
| 6,633,878 B1 * | 10/2003 | Underwood | |
| 6,983,414 B1 * | 1/2006 | Duschatko | H03M 13/015 714/776 |

(Continued)

*Primary Examiner* — Jeffrey A Burke
*Assistant Examiner* — Thong Vu
(74) *Attorney, Agent, or Firm* — Wolfe-SBMC

(57) ABSTRACT

Systems and methods herein provide for a clustered content management comprising at least two computing nodes. A first node comprises an instance of the content repository. The first computing node may perform content management operations on its instance of the content repository. Changes to the instance of the content repository of the first computing node are synchronized with the content repository by way of a second computing node. The second computing node is communicatively coupled to the first computing node through a network and is operable to synchronize the change with the content repository. The second computing node also determines that synchronization of the change is blocked due to an error. The second computing node identifies the error, determines that the error is correctable, and corrects the error to synchronize the change with the content repository.

25 Claims, 10 Drawing Sheets

(56) References Cited

U.S. PATENT DOCUMENTS

| | | | |
|---|---|---|---|
| 8,799,867 B1* | 8/2014 | Peri-Glass | G06F 11/3668 717/100 |
| 9,052,944 B2* | 6/2015 | Moir et al. | |
| 2002/0095399 A1* | 7/2002 | Devine et al. | 707/1 |
| 2003/0037280 A1* | 2/2003 | Berg et al. | 714/6 |
| 2003/0179230 A1* | 9/2003 | Seidman | 345/750 |
| 2004/0205420 A1* | 10/2004 | Seeley et al. | 714/57 |
| 2006/0179058 A1* | 8/2006 | Bram | G06F 21/121 |
| 2007/0022244 A1* | 1/2007 | Kimmery | 711/106 |
| 2007/0112785 A1* | 5/2007 | Murphy et al. | 707/10 |
| 2009/0216796 A1* | 8/2009 | Slik | G06F 17/3012 |
| 2009/0216910 A1* | 8/2009 | Duchesneau | G06F 9/5072 709/250 |
| 2009/0271412 A1* | 10/2009 | Lacapra et al. | 707/10 |
| 2010/0257457 A1* | 10/2010 | De Goes | G06Q 10/10 715/751 |
| 2012/0036498 A1* | 2/2012 | Akirekadu et al. | 717/124 |
| 2013/0275391 A1* | 10/2013 | Batwara et al. | 707/689 |
| 2014/0358860 A1* | 12/2014 | Wautier | G06F 17/30575 707/638 |

* cited by examiner

SELF HEALING CLUSTER OF A CONTENT MANAGEMENT SYSTEM

TECHNICAL FIELD

This disclosure generally relates to the field of content management systems.

BACKGROUND

Content management is a formalized process of storing, organizing, and providing access to various forms of content including digital documents, digital images, video, and audio. The process maintains integrity of the content when many users are able to access and edit the content. Some content management systems known as Enterprise Content Management (ECM) systems maintain the integrity of the organization's content across an enterprise-wide platform.

SUMMARY

Systems and methods herein provide for self-correcting, or "self-healing", of a node of a clustered content management system. In one embodiment, the content management system comprises a content repository and a first computing node operable to load a first instance of the content repository and to change the first instance of the content repository. The content management system also comprises a second computing node communicatively coupled to the first computing node through a network. The second computing node is operable to synchronize the content repository with the change to the first instance of the content repository, to determine that synchronization of the change is blocked due to an error, to identify the error blocking the synchronization, to determine that the error is correctable, and to correct the error to synchronize the change with the content repository.

Although discussed with respect to one particular embodiment, the invention is not intended to be limited to the embodiment. Other embodiments are also disclosed herein and may be implemented in various ways and/or combined with one another as a matter of design choice. For example, the embodiments may take the form of computer hardware, software, firmware, or combinations thereof.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

Figure 1A:
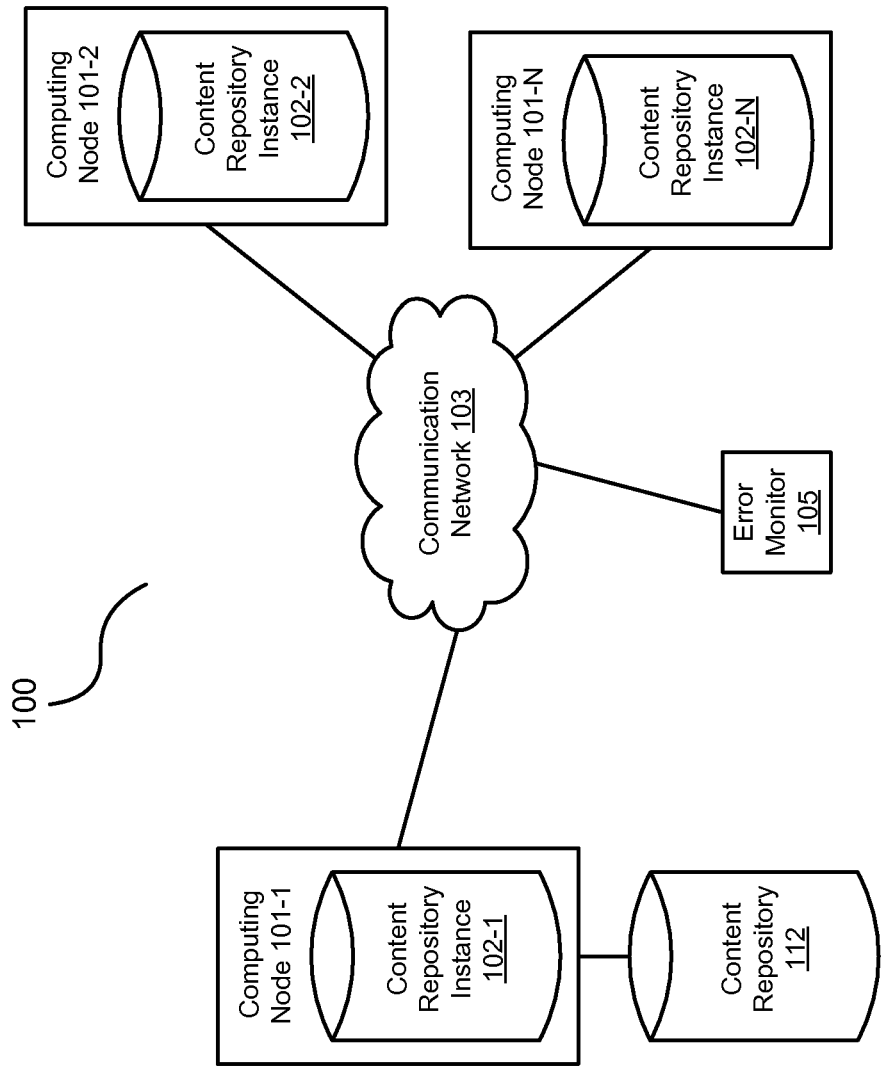
FIGS. 1A-1D are block diagrams of an exemplary content management system healing a computing node.

Prior ECM systems provide an enterprise-wide platform that allows users to manage, and, delete, or otherwise change content maintained by enterprises. A prior ECM system controls the access and management of the content for the enterprise to ensure the integrity of the content for the enterprise. For example, when users are allowed to haphazardly alter content of an enterprise, multiple inconsistent versions of the content can be created. In some instances, such as large-scale marketing efforts by the enterprise, multiple versions of the content can create an inconsistent theme or message for the enterprise. More importantly, multiple versions of the content create confusion amongst those operating on the content.

Prior ECM systems have evolved and are now typically configured with a centralized database where users access the content through the tools of the ECM system. In many prior ECM systems, the database is a "content repository" that operates as a digital library to allow users with access to the library to search, retrieve, modify, and store content through the tools of the ECM system. The content repository provides the users access to the content therein with the ECM system maintaining the overall integrity of the content.

A problem with such prior centralized databases, however, is that they stifle collaboration. For example, content repositories in prior ECM systems are typically implemented as client/server systems with the content repository being maintained with the server. Users access the content repository through clients while the ECM system maintains control over the content repository via the server. When groups of users (i.e., user groups) are spread across an enterprise, in some instances across many countries, access to a central content repository is difficult because the communication infrastructure does not support the rapid changes made by users of the content. Moreover, a single management entity operating as a master to ensure the integrity of the content is subject to workflow outages. For example, if a master entity ever malfunctions or otherwise fails, users may not be able to access and operate on the content in the content repository.

The ECM systems disclosed herein according to embodiments of the present invention overcome the problems associated with prior ECM systems by providing a more collaborative form of content repository. These embodiments allow multiple users to be spread out through an enterprise while also providing a flexible form of content management that is needed in a collaborative environment. The present embodiments, however, still provide control over the content such that content integrity is maintained. Moreover, the ECM systems disclosed herein according to embodiments of the present invention are operable to "heal" themselves in the event of a failure such that ECM operations on the content repository can continue unabated.

In accordance with one embodiment of the present invention, a clustered ECM system is configured with a plurality of computing nodes through which users interact and operate on content in a content repository via content management tools. In this clustered ECM system embodiment, one of the nodes operates as a "master" or primary computing node that controls the content within the content repository either directly or through an "instance" of the content repository. The other "slave" or subordinate computing nodes operate on the content repository through instances of the content repository that are routinely synchronized with the content repository to ensure the integrity of the content therein. If any computing node fails in the clustered ECM system, the computing node is operable to "heal" itself and correct any problems that would affect the content repository or the ECM system in general. For example, if a network error prevents a computing node from synchronizing with the content repository, the computing node can detect and correct the network error (e.g., by resetting a network interface card) such that ECM operations can continue without corruption to the content repository. Additionally, if the primary computing node needs to relinquish control of the content in the content repository for almost any reason (e.g., node failure, access restriction, etc.), a subordinate computing node can assume control of the content in the content repository and function as the primary computing node.

The ECM systems according to embodiments of the present invention herein may maintain integrity of a variety of forms of content when multiple users are adding or otherwise changing the content in the content repository. One example of an ECM system includes a Web Content Management System (WCMS) that provides tools for website authoring, collaboration, and administration for users without requiring the users to have extensive knowledge of programming languages. WCMSs are used extensively by marketing departments of large organizations to convey a consistent message or image to the public with ever-changing content. The WCMS tools are typically implemented as automated templates to allow users to audit, edit, and manage web content (e.g., digital documents, digital images, video content, audio content, etc.). Another example of an ECM system may include version control systems for software and/or documents.

Although the content repositories herein may be configured in a variety of ways as a matter of design choice, in one embodiment, the content repository is configured as an object database where content is represented in the form of "objects" that are implemented with object-oriented programming techniques and organized in a hierarchical manner. Object-oriented programming is a programming paradigm that represents concepts as objects with data fields, or "attributes", that describe the objects. Associated procedures, known as methods, are then used to operate on the objects. One example of an object-oriented content repository is a Java Content Repository, or "JCR". Standards for JCRs have been established by the Java Community Process (JCP), an open source software committee. Examples of JCRs that have been implemented under these standards include the Apache Jackrabbit JCR, the eXo Platform, and Modeshape.

As mentioned, the ECM systems according to embodiments of the present invention are operable to provide instances of the content repository. An instance in object-oriented programming is generally a specific realization of an object (e.g., the content repository). An object may be varied in a number of ways and each realized variation of that object is an instance. Thus, an instance of the content repository may be operated on to modify, add, remove, etc. content from the content repository. And, a content repository according to embodiments of the present invention herein is any device, system, software, or combination thereof operable as an object database to maintain integrity of the objects and provide or otherwise create instances of the content repository on computing nodes in a clustered ECM system. The content repositories are operable on any of a variety of computing systems, such as computer network servers, computers, and the like.

A computing node according to embodiments of the present invention herein is any device, system, software, or combination thereof operable to provide users with the ability to change the content repository (e.g., edit and/or add objects/content of the content repository) through its instances. Examples of the computing nodes include laptop computers, tablets, smart phones, and the like configured with processing capabilities and operating system environments that enable software based content management tools of the ECM to operate on the instances.

A slave computing node or subordinate computing node according to embodiments of the present invention herein is any device, system, software, or combination thereof operable to operate on instances of a content repository to make changes to objects within the content repository. The subordinate computing node, after changes are made to the objects (by the present computing node or other computing nodes), is operable to routinely synchronize its instance with the content repository. For example, the subordinate computing node may make changes to its instance and then, through the software tools of the ECM, transfer the changes across a data network such that the master computing node or primary computing node may reflect those changes in the content repository if it deems them allowable.

After changes to the content repository via the instance of the subordinate computing node are deemed allowable by the primary computing node, the instance on the subordinate computing node may be "refreshed" with any changes deemed allowable by the primary computing node. The primary computing node, therefore, is according to embodiments of the present invention any device, system, software, or combination thereof operable to synchronize changes of subordinate computing nodes with the content repository. The primary computing node may also be operable to make changes to the content repository, either directly or through an instance.

Examples of the content management tools of the ECM include software tools operable in an operating system environment of a computing node to provide a variety of operations including, but not limited to, records management, document management, email management and archiving, image management, help desk management, library management, asset management, human resources management, customer relationship management, content management repository, business process management, and contract management.

A network herein is any type of communication infrastructure that provides for the transfer of data between devices/systems. Some examples of networks include digital phone networks, local area networks (LANs), wide area networks (WANs), and the Internet.

Certain exemplary embodiments of the content management system are now shown and described with respect to the following figures. While the figures and the following description illustrate specific exemplary embodiments of the invention, it will be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

FIGS. 1A-1D are block diagrams of an exemplary content management system according to embodiments of the present invention 100 healing a computing node 101. As shown in FIG. 1A, the content management system 100 comprises a plurality of computing nodes 101-1-101-N (where "N" is simply intended as an integer greater than 1 and not necessarily equal to any other "N" reference number). In this example, the computing node 101-1 is a primary computing node that maintains control and integrity of the content repository 112 in the content management system 100, either directly or through an instance 102-1 of the content repository 112. The computing node 101-1 may also be operable to provide for the creation of the instances within the computing nodes 101-1-101-N.

Each computing node 101 is operable to load and maintain an instance 102 of a content repository 112 for the content management system 100. Each computing node 101 in the content management system 100 is operable to correct errors blocking synchronization of the instances 102 that could corrupt the integrity of the content repository 112.

Figure 1B:
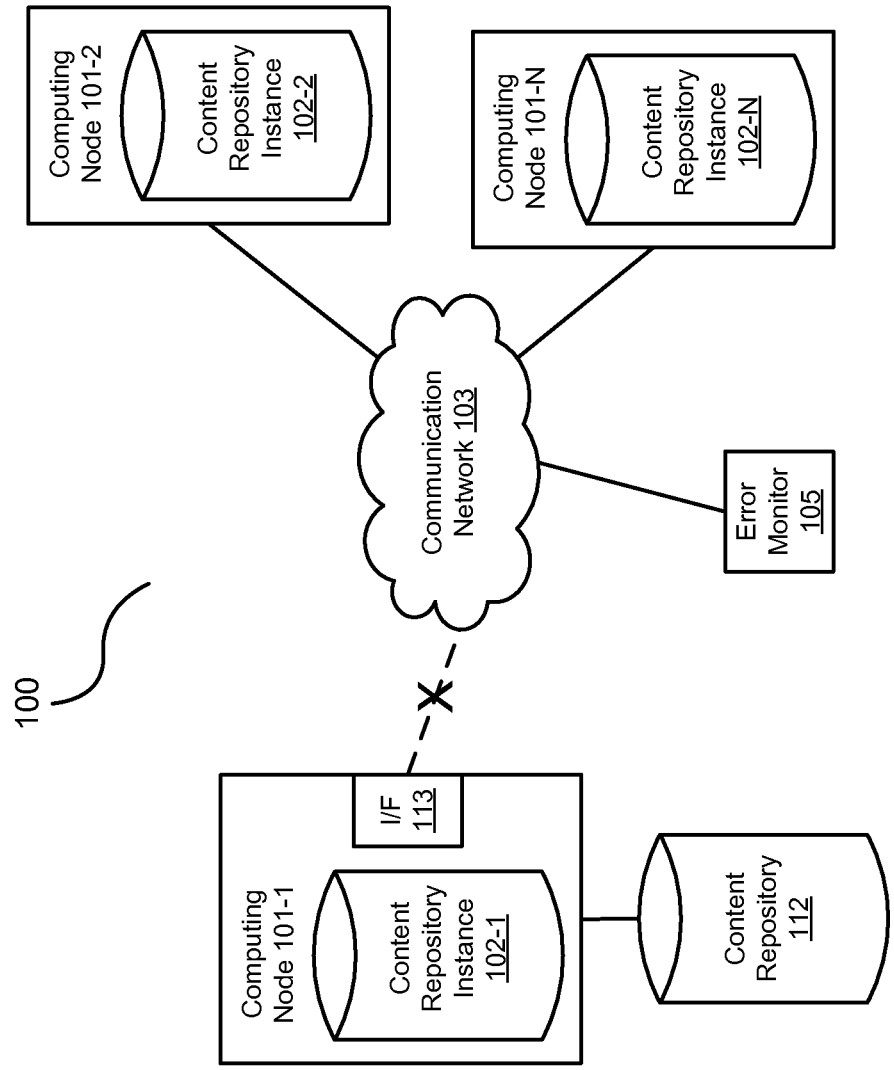

To illustrate, the content management system 100 according to embodiments of the present invention allows users, through their respective computing nodes 101-1-101-N, to perform content management operations on their instances 102-1-102-N of the content repository 112. The computing node 101-1, being the primary computing node, is operable to communicatively couple to the computing nodes 101-2-101-N through a communication network 103 to synchronize changes to the content repository 112 made through any of the content repository instances 102-1-102-N. If synchronization is blocked due to some error with any one of the computing nodes 101-1-101-N, the failing node 101 is operable to detect the error and, if correctable, correct the error such that synchronization can resume. FIG. 1B illustrates one exemplary error, a network error, that could prevent synchronization.

Figure 1C:
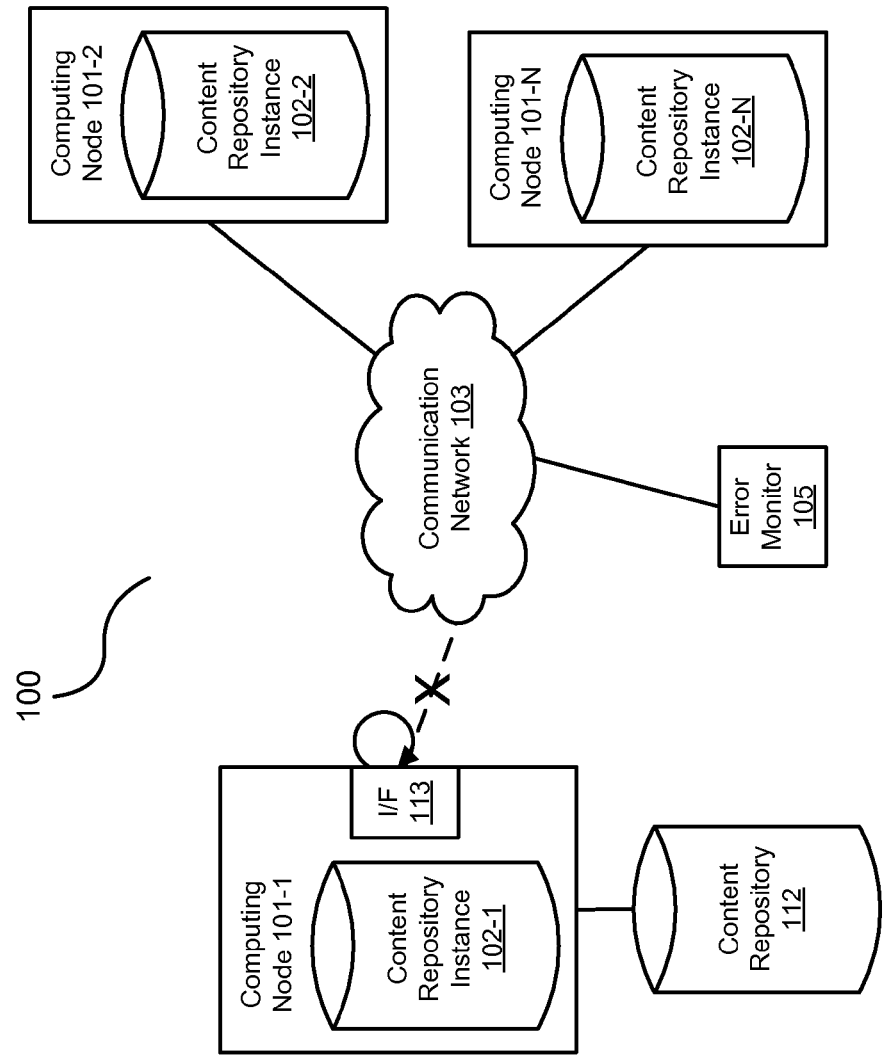

In FIG. 1B, a network interface 113 of the computing node 101-1 inexplicably crashes. The computing node 101-1, as it readies to synchronize the instances 102-1-102-N, detects that it cannot communicate with the other computing nodes 101-2-101-N. The computing node 101 performs a diagnostic and determines that the communication problem is with its network interface 113. Accordingly, the computing node 101-1 restarts the network interface 113 in an attempt to correct the problem, as illustrated in FIG. 1C.

Figure 1D:
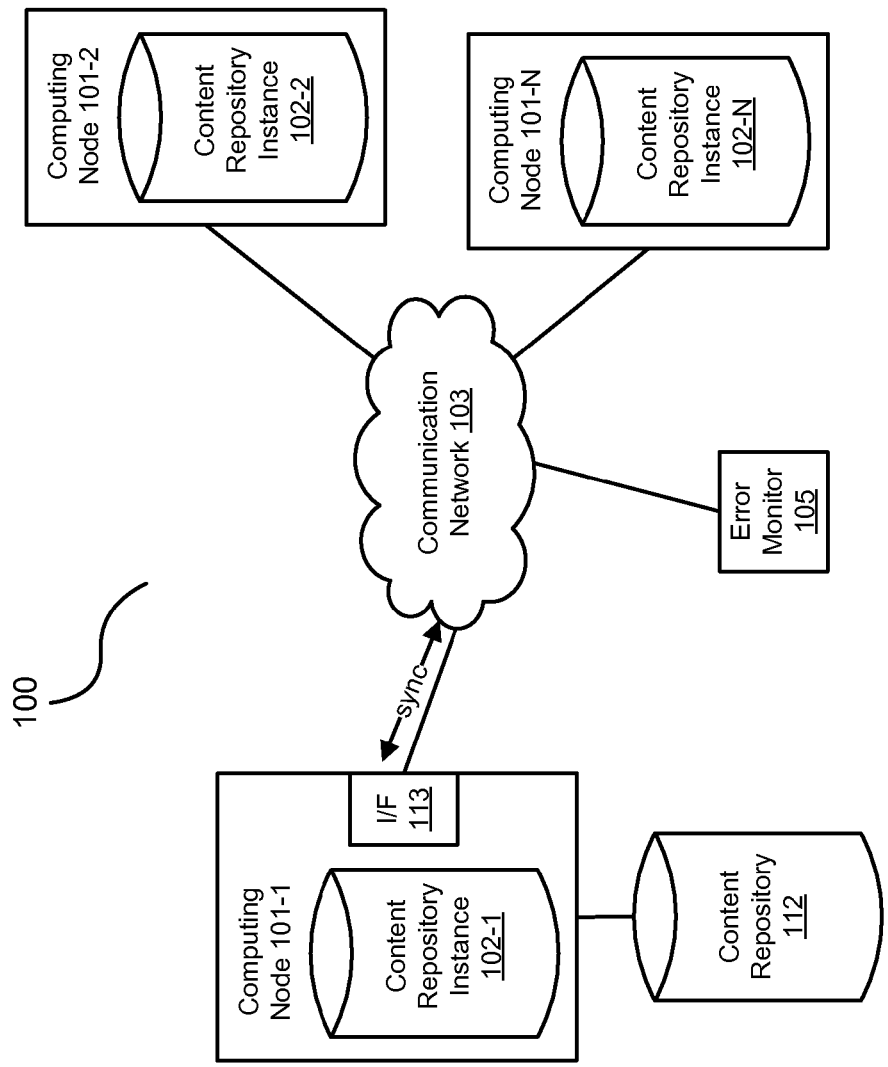

In FIG. 1D, the computing node 101-1 is shown with the network interface problem being corrected and communications being reestablished with the other computing nodes 101-2-101-N. Accordingly, the computing node 101-1 is able to synchronize with the instances 102-1-102-N of the content repository 112.

In one embodiment, an error monitor 105, such as a Java Management Extension (JMX) monitor, is configured with the content management system 100 either external to or within one or more of the computing nodes 101-1-101-N to detect the various errors that could block synchronization.

It should be noted that the content management system 100 is not intended to be limited to any particular number or arrangement of components. For example, the content repository 112 may be part of a separate content management system, it may be implemented within the computing node 101-1 of the content management system 100, or it may be a standalone content repository.

As similarly stated above, the computing nodes 101-1-101-N are any devices, systems, software, or combinations thereof operable to load or otherwise create instances of the content repository 112 to perform content management operations. Examples of the computing nodes 101-1-101-N include tablet devices, computers, smart phones, and the like.

The content repository 112 is any device, system, software, or combination thereof operable to store and maintain objects on behalf of the content management system 100. One example of the content repository 112 is an object database, such as a JCR. The communication network 103 is any network capable of transferring data, such as the Internet, a Local Area Network, a Wide Area Network, etc. Examples of objects that may be changed by the computing nodes 101-1-101-N through their respective content repository instances 101-2-102-N include electronic files (e.g., audio content, video content, documents, etc.), data, and associated metadata. Examples of changes that may be made include storing new objects, deleting existing objects, and altering existing objects.

Figure 2:
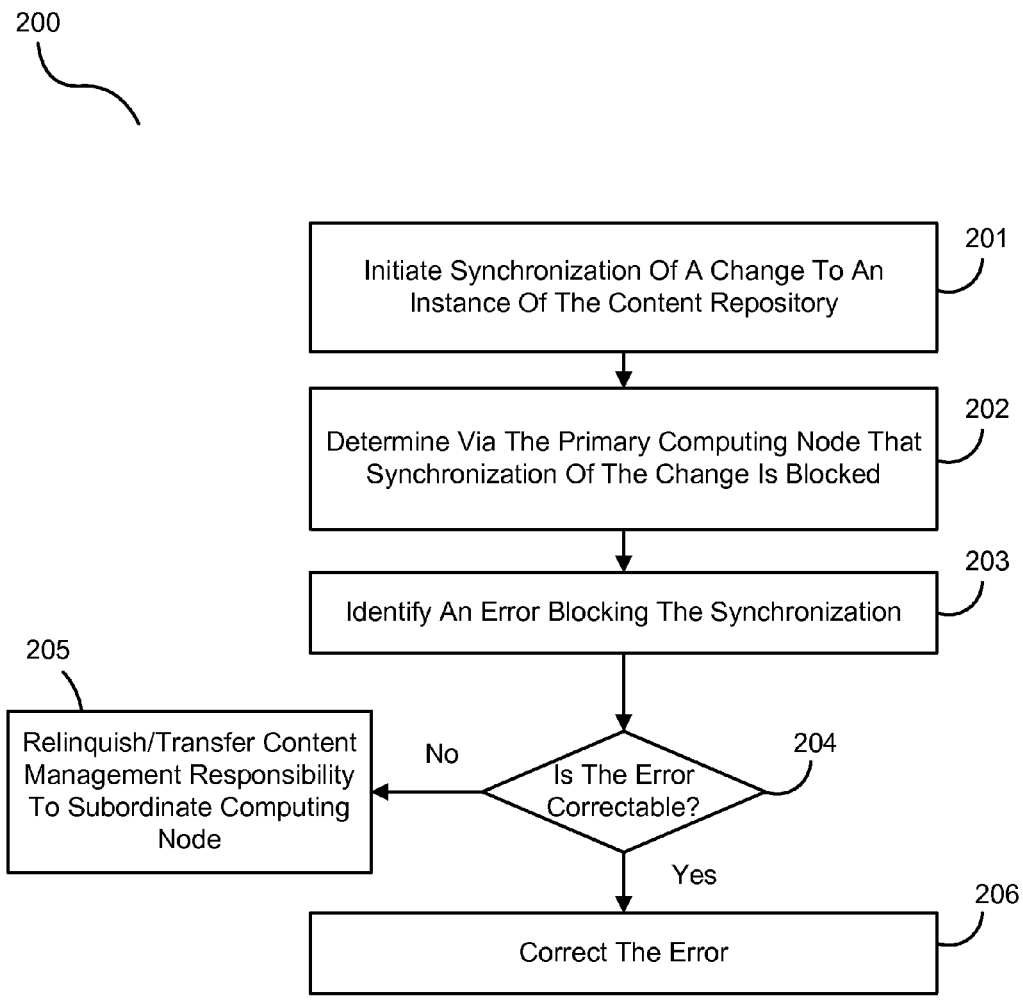
FIG. 2 is a flowchart of an exemplary process of the content management system of FIG. 1.
Figure 3:
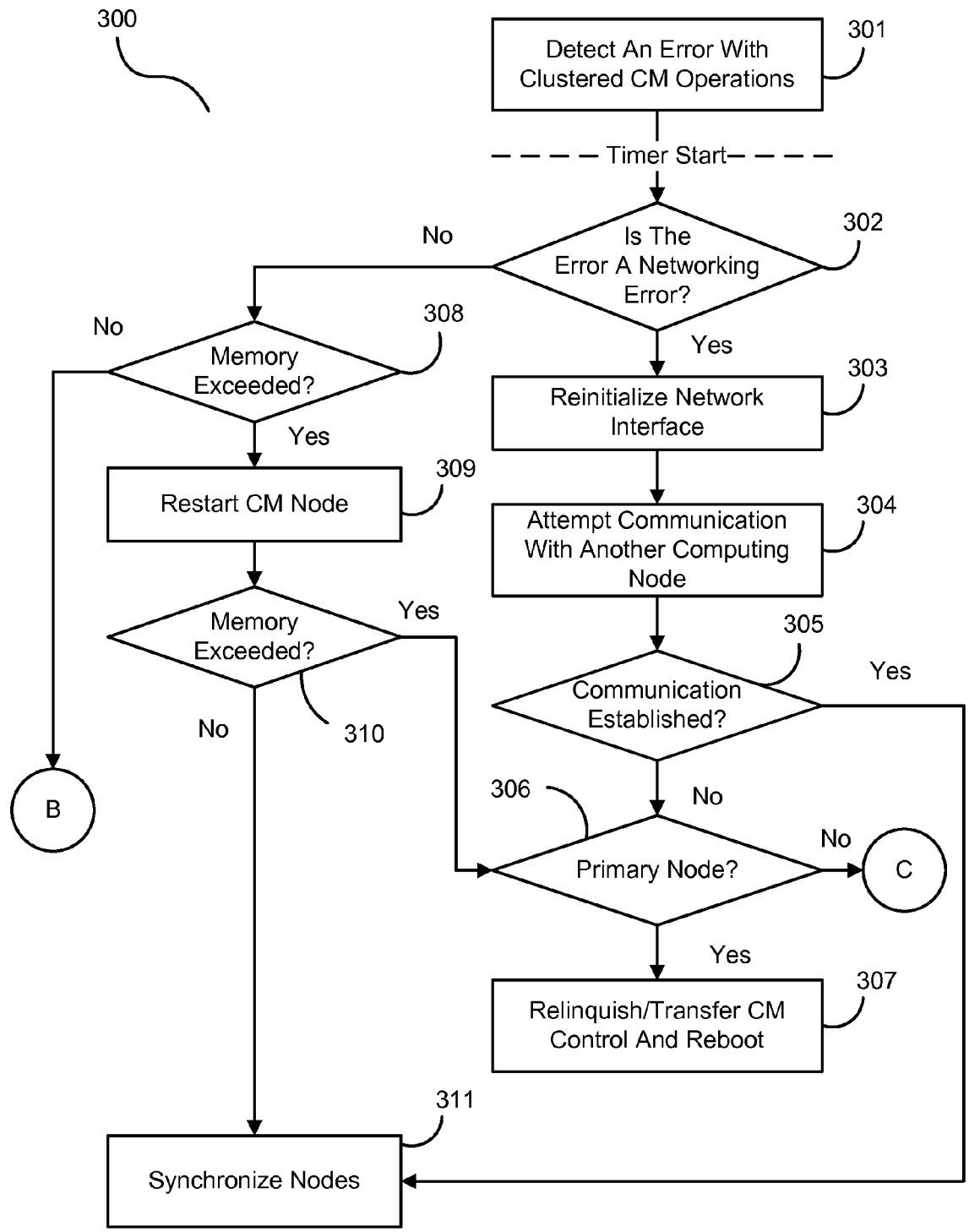
FIGS. 3-6 are flowcharts of another exemplary process of the content management system of FIG. 1.

Certain operational aspects of the content management system 100 are now described with respect to the flowchart of FIG. 2.

FIG. 2 is a flowchart of an exemplary process 200 of the content management system 100 of FIG. 1 according to embodiments of the present invention. For the purpose of simplicity, the content management system 100 is presumed to be operational with two computing nodes 101-1 and 101-2 implemented as a clustered content management system. In this regard, the computing node 101-1 is the primary node and the computing node 101-2 is the subordinate node. An instance 102-2 of the content repository 112 is loaded on the subordinate computing node 101-2 and changes are being made to the content repository 112 therefrom. For example, the computing node 101-2 may perform content management operations on objects represented by the content repository instance 102-2. These changes, when synchronized with the content repository 112, affect the objects within the content repository 112.

In the process element 201, the computing node 101-1 initiates synchronization of the change with the content repository 112. Due to some error, the computing node 101-1 determines that the synchronization of the change is blocked, in the process element 202. For example, the computing node 101-1 may have an internal error that prevents the computing node 101-1 from performing the synchronization. Alternatively, the error blocking synchronization of the change may be local to the subordinate computing node 101-2. Examples of such errors include network errors that affect communication with the computing node 101-2 through the communication network 103, run-time errors, memory overruns, storage capacity limits, etc.

In any case, the computing node 101-1 identifies the error blocking the synchronization, in the process element 203, and determines whether the error is correctable, in the process element 204. For example, the computing node 101-1 may determine that is experiencing a network error that prevents it from communicating with the computing node 101-2. If the network error can be corrected by the computing node 101-1 (e.g., by resetting a network interface card), then the computing node 101-1 corrects the error such that synchronization of the content repository instance 102-2 with the content repository 112 can resume, in the process element 206. If the error cannot be corrected, then the computing node 101-1 may relinquish/transfer synchronization control and content management responsibility to the computing node 101-2, in the process element 205.

Alternatively, the computing node 101-1 may detect that the error resides with the computing node 101-2. In such a case, the computing node 101-1 may attempt to direct the computing node 101-2 to correct its error (e.g., by directing the computing node 101-2 to reset a network interface card, reboot, etc.). If the computing node 101-2 is unable to correct its error, then the computing node 101-1 may remove the computing node 101-2 from content management operations. For example, the computing node 101-2 may be prevented from having access to operations on the content repository 112 through its content repository instance 102-2.

Again, for the purpose of simplicity, only two computing nodes 101-1 and 101-2 were discussed. The invention, however, is not intended be limited to any number of computing nodes 101. And, as discussed, any of the computing nodes 101-1-101-N within the content management system 100 may be operable to correct its errors, continue performing content management operations through its corresponding content repository instance 102, and acquire content management control when a primary computing node fails.

FIGS. 3-6 illustrate another exemplary process 300 that may be operable with the content management system 100 according to embodiments of the present invention. In this embodiment, the process 300 illustrates one exemplary operation in which any one of the computing nodes 101-1-101-N could detect and potentially correct errors. Thus, reference to the computing node is with respect to any computing node 101.

The process 300 initiates when the computing node 101 detects an error with the clustered content management operations, in the process element 301. At this time, the detecting computing node 101 may initiate a timer that dictates how much time the computing node 101 has to correct the error. In this embodiment, the computing node 101 first determines that the error is a networking error, in the process element 302. If the error is a network error, the computing node 101 reinitializes its network interface, in the process element 303 (e.g., by resetting a network interface card) and then attempts communication with another computing node 101, in the process element 304.

In the process element 305, the computing node 101 determines whether communications are established with another computing node 101. If communications are established with another computing node 101, then the computing node 101 synchronizes its content repository instance 102 with the content repository 112 (e.g., as either a primary computing node or a subordinate computing node).

If communications are not established in the process element 305, the computing node 101 determines whether it is a primary node, in the process element 306. If the computing node 101 is a primary computing node, then the computing node 101 relinquishes content management control over the content repository 112 in the process element 307. In this regard, another subordinate computing node 101 may detect the failure by the primary computing node 101 to automatically acquire content management control (e.g., because there is no communication with the primary computing node 101). Thereafter, the former primary computing node 101 may reboot for potential error correction and reintroduction into content management system and operations. When a computing node 101 can no longer function as a primary, the subordinate computing nodes 101 may determine which of the subordinate computing nodes 101 is to retain content management control as the primary (e.g., via some voting process, a previous number of content management operations performed, etc.). If the failing computing node 101 is not a primary computing node, however, then the computing node 101 may proceed to remove itself from the clustered content management system 100, in the process element 363 of FIG. 6 (via link "C").

If the error is not a networking error (i.e., the process element 302), then the computing node 101 determines whether its content management operations have exceeded its memory capabilities, in the process element 308. For example, the computing node 101 may load or otherwise create a content repository instance 102 within computer memory of the computing node 101. If the content repository instance 102 requires more computer memory than is available (e.g., due to content management operations on the content repository instance 102, the size of the content repository instance 102, etc.), then the computing node 101 may restart the content management system/software operating on the computing node 101, in the process element 309. Alternatively, the computing node 101 may examine applications currently using the computer memory to determine whether they may be shut down.

Thereafter, the computing node 101 may again determine whether the memory is exceeded, in the process element 310. If the memory is not exceeded, then the computing node 101 begins to synchronize the content repository instance 102 with another computing node 101, in the process element 311 (e.g., as a primary computing node or as a subordinate computing node). If, however, the computing node 101 determines that the memory has been exceeded, in the process element 310, then the computing node 101 may determine whether it is a primary computing node, in the process element 306, to relinquish content management control and/or remove itself from content management operations (i.e., the process elements 307 and 363).

Figure 4:
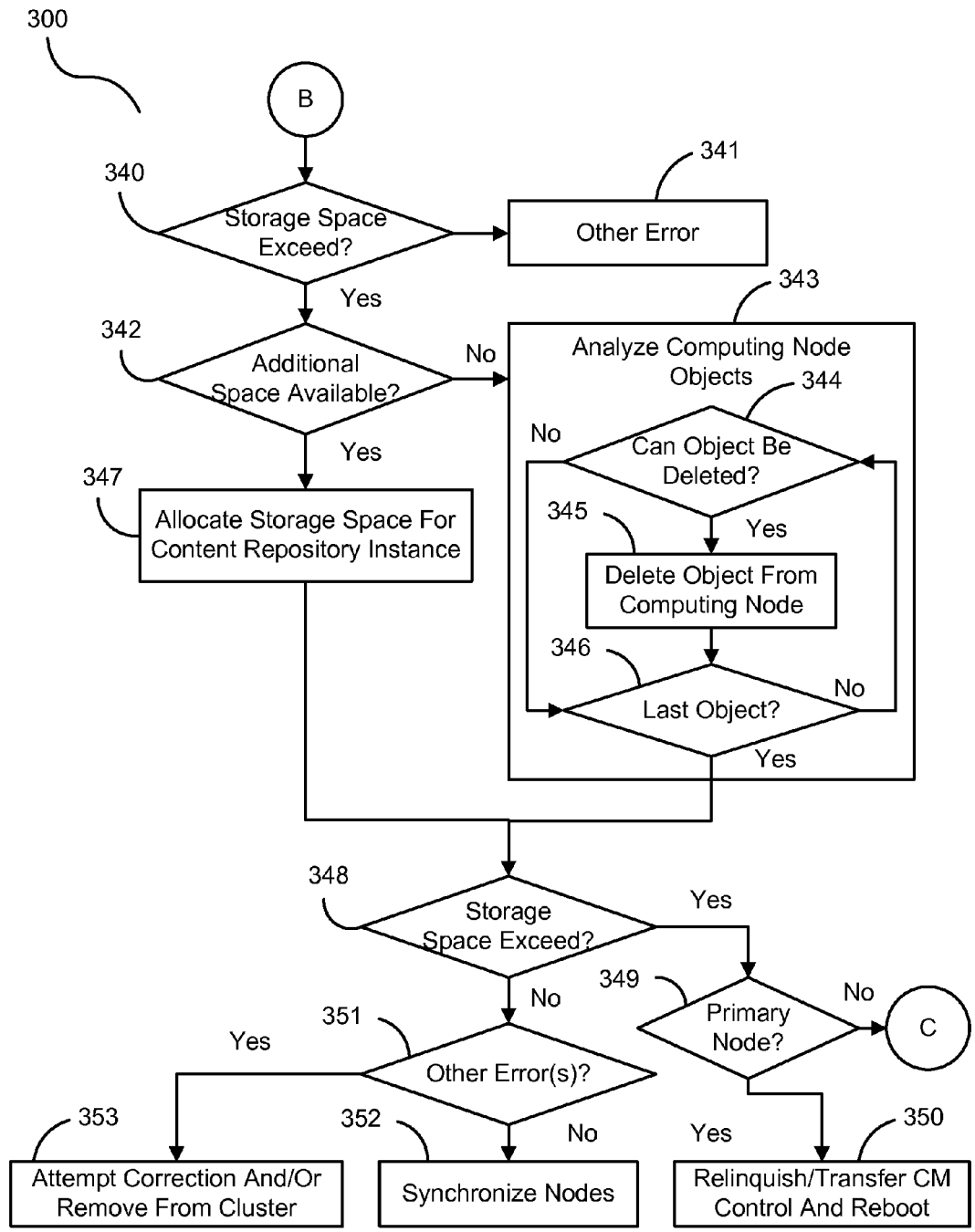

If the computing node 101 determines that the memory has not been exceeded, in the process element 308, then the process proceeds to the process element 340 of FIG. 4 (via link "B") to identify another potential error. In this embodiment, the computing node 101 determines whether storage space has been exceeded with the computing node 101, in the process element 340. For example, while operating on its content repository instance 102, the computing node 101 may add objects to the content repository instance 102 through typical content management operations. If these objects exceed the storage capacity of the computing node 101 (e.g., disk drive capacity), then the computing node 101 may attempt to determine whether additional space is available or can be made available, in the process element 342. If the error is not associated with storage capacity of the computing node 101, then the computing node 101 may determine that another error exists, in the process element 341 and attempt to correct the error through another manner.

If additional storage space is available, in the process element 342, the computing node 101 may allocate the storage space for the content repository instance 102, in the process element 347. For example, the computing node 101 may comprise a partitioned hard drive. The computing node may acquire storage space from another partition the hard drive and reallocate that storage space to the partition employing content management operations. If no additional storage space is available, the computing node 101 may analyze objects in the computing node, in the process element 343, to determine whether certain objects can be deleted to make additional space. The computing node 101 may perform this process by searching each of the objects, determining whether an object can be deleted (i.e., the process element 344), and deleting a deletable object (i.e., the process element 345), until the last object is reached (i.e., the process element 346). Examples of objects that can be deleted from the computing node include temporary files, accumulated metadata, antiquated files, redundant data, and the like.

If after allocating additional storage space for the content repository instance 102 or deleting certain objects from the computing node 101, the computing node 101 determines whether the storage space is still exceeded, in the process element 348. If the storage space is still exceeded, then the computing node 101 may determine whether it is a primary node, in the process element 349 so as to either relinquish/transfer control of content management operations and/or reboot (i.e., the process element 350) or proceed to remove itself as a subordinate computing node from the clustered content management operations, in the process element 363 of FIG. 6 (via link "C").

If the storage space is not exceeded, in the process element 348, after storage space allocation (i.e., the process element 347) or deletion of files (i.e., the process element 343), then the computing node 101 determines whether other errors may exist, in the process element 351. For example, if storage space is available but there is still something blocking synchronization, then the computing node 101 may determine that another error exists. If no other errors exist, then the computing node 101 synchronizes its content repository instance 102, in the process element 352 (e.g., either as a primary computing node or as a subordinate computing node as discussed above). If other errors remain that will prevent the synchronization from occurring, the computing node 101 may attempt correction of those errors and/or remove itself from the clustered content management operations (and relinquish/transfer content management control if a primary computing node), in the process element 353.

Figure 5:
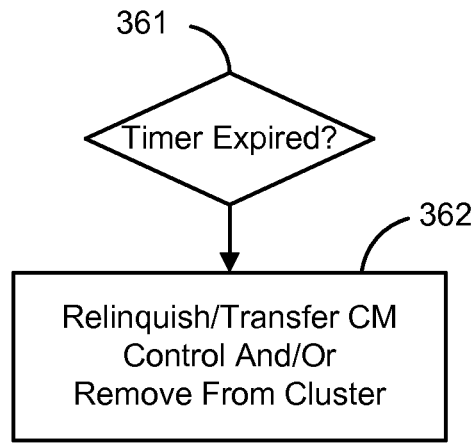
Figure 6:
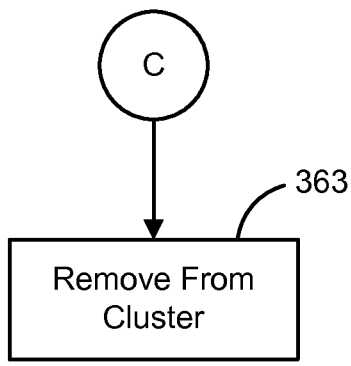

As mentioned previously, the computing node 101 may initiate a timer that dictates how much time the computing node 101 has to recover from a detected error. If the detected error cannot be corrected within the allocated time as shown in FIG. 5, the computing node 101 may relinquish/transfer synchronization and content management control to a subordinate computing node 101 and/or remove itself from the clustered content management operations, in the process element 362. The timer can be configured in a variety of ways as a matter of design choice. For example, the timer can be configured to limit the amount of time that the computing node 101 takes to identify a particular error, to correct a particular identified error, etc.

While the flowcharts illustrated in FIGS. 2-6 are arranged in a particular order, the invention is not intended be limited to the illustration. For example, if a primary computing node 101 detects it has an error that prevents it from synchronizing content repository instances 102, then the primary computing node 101 may attempt to identify and correct the error in alternative ways (e.g., first determine whether memory has been exceeded and then determine if the error is a networking error, etc.). Also, the types of errors that the computing nodes 101 may experience are not intended to be limited to the illustrated errors. Rather, the illustrated errors are merely intended to be examples of a variety of errors, correctable and uncorrectable, that could occur with the computing nodes 101.

Figure 7:
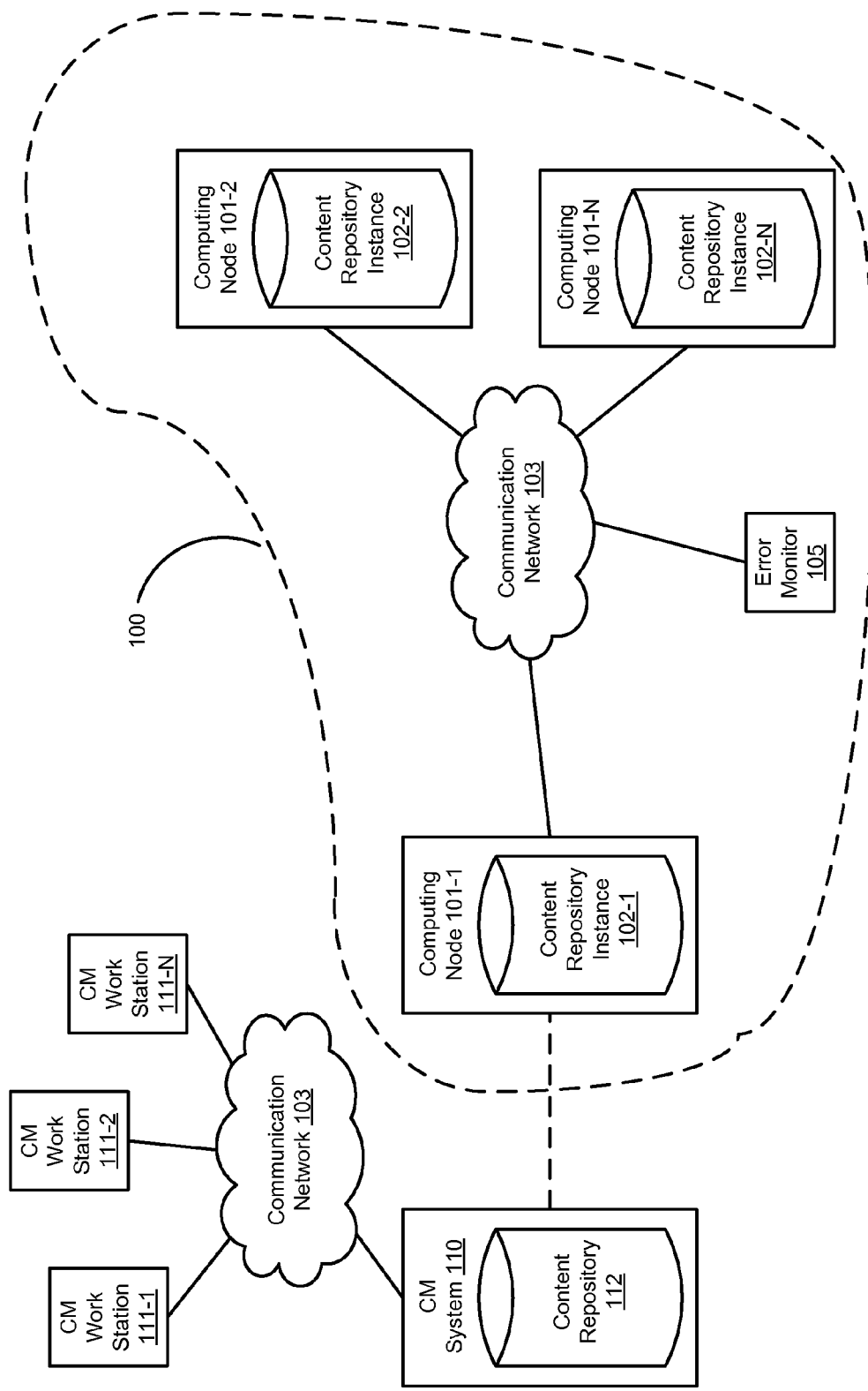
FIG. 7 is a block diagram of another exemplary content management system.

FIG. 7 illustrates another embodiment where the content repository 112 is configured within a centralized content management system 110 according to embodiments of the present invention from which an instance 102-1 of the content repository 112 is created with the computing node 101-1. Whereas the content management workstations 111-1-111-N (e.g., computers, tablet devices, smartphones, etc.) may be operable to operate directly on the content repository 112 from the content management system 110, the computing node 101-1 is operable to operate on the content repository 112 indirectly through the content repository instance 102-1. Changes to the instance 102-1 may be subsequently synchronized with the content management system 110. In this embodiment, the computing node 101-1 is still operable as a primary computing node for the content management system 100 to provide or otherwise create content repository instances 102-2-102-N for use by the computing nodes 101-2-101-N. The computing node 101-1 may synchronize changes to those instances with the content repository 112 as shown and described above.

Figure 8:
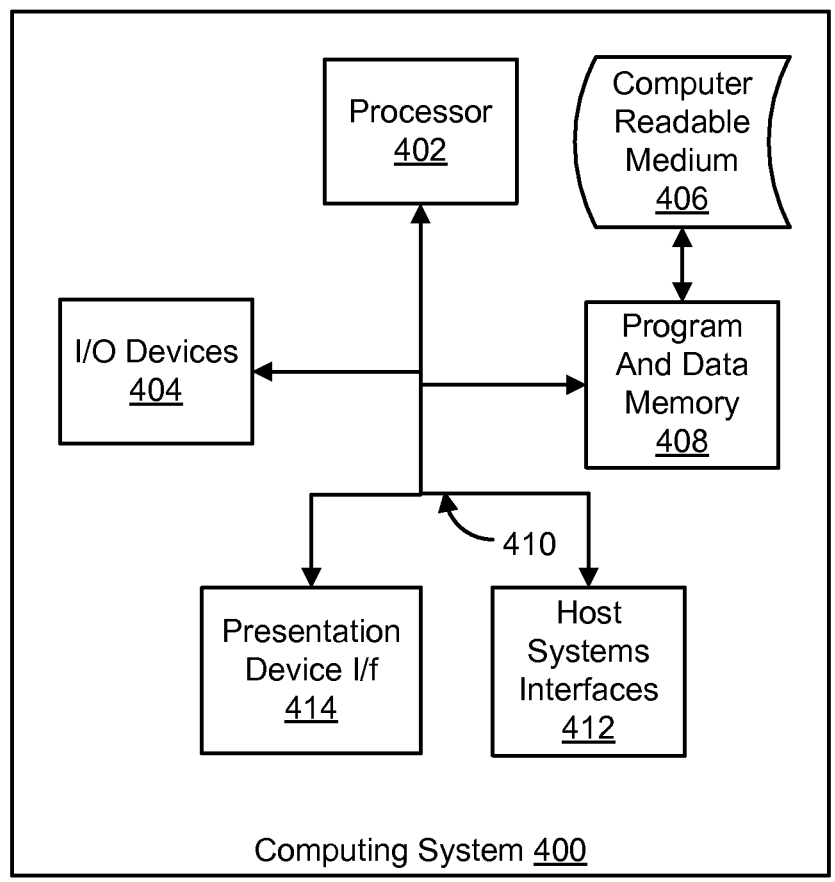
FIG. 8 illustrates a computing system in which a computer readable medium provides instructions for performing methods herein.

The invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 8 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computing system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 400, being suitable for storing and/or executing program code, can include one or more processors coupled directly or indirectly to memory 408 through a system bus 410. The memory 408 can include local memory employed during actual execution of the program code, bulk storage, and cache memories, which provide temporary storage of at least some program code in order to reduce the number of times code is retrieved from bulk storage during execution. Input/Output (I/O) devices 404 (including but not limited to keyboards, displays, pointing devices, etc.) can be coupled to the computing system 400 either directly or through intervening I/O controllers. Network adapters may also be coupled to the computing system 400 to enable the computing system 400 to become coupled to other data processing systems, such as through host systems interfaces 412, remote printers, and/or storage devices through intervening private or public networks. Modems, cable modems, and Ethernet cards are just a few of the currently available types of network adapters.

What is claimed is:

1. A content management system, comprising:
   a content repository configured to maintain content;
   a first computing node including a first computing node processor operable to execute instructions to load a first instance of the content repository into a first computing node memory and to change the first instance of the content repository while not synchronizing the change to the content repository, the first instance of the content repository being a separate realized variation of the content repository;
   a second computing node communicatively coupled to the first computing node through a network, the second computing node including a second computing node processor operable to execute instructions to:

synchronize the content repository with the change to the first instance of the content repository that is loaded on the first computing node, the change including editing the content via the first instance of the content repository;
determine that synchronization of the change is blocked due to an error;
identify the error blocking the synchronization;
determine whether the error is correctable or not correctable based on the error being identified as one of a network error or a storage space limit error;
responsive to the determination that the error is correctable, correct the error to synchronize the change with the content repository; and
responsive to the determination that the error is not correctable, relinquish synchronization control between the first instance of the content repository and the content repository.

2. The content management system of claim 1, further comprising:
a third computing node including a third computing node processor operable to execute instructions to change a second instance of the content repository; and
wherein the first and the third computing nodes are further operable to detect that the second computing node is relinquishing the synchronization control of the content repository, and to communicate with each other to determine which of the first and the third computing nodes takes the synchronization control of the content repository.

3. The content management system of claim 1, wherein:
the second computing node includes a second computing node memory;
the storage space limit error is an error of the second computing node memory that prevents the second computing node from synchronizing the content repository; and
the second computing node is operable to delete one or more objects from the second computing node memory to increase available storage space and correct the error.

4. The content management system of claim 1, further comprising:
a timer operable to start when the second computing node determines that the error is with the second computing node and to direct the second computing node to relinquish synchronization control of the content repository to the first computing node if the error is not corrected upon expiration of the timer.

5. The content management system of claim 1, wherein:
the network error prevents the second computing node from communicating with the first computing node; and
the second computing node is operable to reinitialize a network interface to correct the error.

6. The content management system of claim 1, wherein the second computing node comprises a second instance of the content repository.

7. The content management system of claim 6, wherein the second instance of the content repository is operable to perform the synchronization of the content repository with the change to the first instance of the content repository.

8. The content management system of claim 1, wherein: the content repository is a Java Content Repository.

9. The content management system of claim 1, further comprising:

a Java Management Extension monitor operable to detect the error with the second computing node and to report the error to the second computing node.

10. The content management system of claim 1, wherein the second computing node is operable to detect an error with the first computing node and to direct the first computing node to correct the error.

11. A method operable in a clustered content management system comprising a content repository and at least first and second computing nodes, the method performed by the second computing node comprising:
initiating synchronization of the content repository based on changes to instances of the content repository loaded on the first and second computing nodes, each of the instances of the content repository being a separate realized variation of the content repository, the instances of the content repository including a first instance of the content repository loaded on the first computing node that does not synchronize the changes made on the first instance of the content repository to the content repository and a second instance of the content repository loaded on the second computing node that performs the initiating synchronization between the instances of the content repository to the content repository;
determining that synchronization of the changes with the content repository is blocked due to an error;
identifying the error blocking the synchronization;
determining whether the error is correctable or not correctable based on the error being identified as one of a network error or a storage space limit error;
responsive to the determination that the error is correctable, correcting the error to synchronize the changes with the content repository; and
responsive to the determination that the error is not correctable, relinquishing synchronization control between the instances of the content repository and the content repository.

12. The method of claim 11, further comprising:
detecting, by the first computing node, that the second computing node is relinquishing the synchronization control of the content repository; and
communicating between the first computing node and a third computing node of the content management system to determine which of the first and the third computing nodes takes the synchronization control of the content repository.

13. The method of claim 11, wherein:
said identifying the error comprises determining that a storage space limit of the second computing node has been exceeded; and
the method further comprising deleting one or more objects from the second computing node to increase available storage space and correcting the error.

14. The method of claim 11, further comprising:
starting a timer when the second computing node determines that the error is with the second computing node; and
transferring synchronization control of the content repository to the first computing node if the error is not corrected upon expiration of the timer.

15. The method of claim 11, wherein:
said identifying the error comprises determining that the network error prevents communication between the second computing node and the first computing node; and the method further comprising re-initializing a network interface of the second computing node to correct the error.

16. The method of claim 11, wherein:
the content repository is a Java Content Repository.

17. The method of claim 11, further comprising:
detecting the error of the second computing node via a Java Management Extension monitor; and
reporting the error to the second computing node from the Java Management Extension monitor.

18. The method of claim 11, wherein said initiating synchronization of the content repository is performed by the instance of the content repository loaded on the second computing node.

19. A non-transitory computer readable medium comprising instructions that are executable within a clustered content management system that includes a content repository and at least first and second computing nodes, the instructions, when executed by a processor, are operable to direct the second computing node to:
initiate synchronization of the content repository based on changes to instances of the content repository loaded on the first and second computing nodes, each of the instances of the content repository being a separate realized variation of the content repository, the instances of the content repository including a first instance of the content repository loaded on the first computing node that does not synchronize the changes made on the first instance of the content repository to the content repository and a second instance of the content repository loaded on the second computing node that initiates the synchronization of the content repository;
determine that synchronization of the change with the content repository is blocked due to an error;
identify the error blocking the synchronization;
determine whether the error is correctable or not correctable based on the identified error being identified one of a network error or a storage space limit error;
responsive to the determination that the error is correctable, correct the error to synchronize the changes with the content repository; and
responsive to the determination that the error is not correctable, relinquish synchronization control between the instances of the content repository and the content repository.

20. The computer readable medium of claim 19, wherein the computer readable medium further comprises instructions that direct the first computing node and a third computing node in the content management system to:
detect that the second computing node is relinquishing the synchronization control of the content repository; and
determine which of the first and the third computing nodes takes the synchronization control of the content repository.

21. The computer readable medium of claim 19, wherein:
the storage space limit error is a memory error of the second computing node that prevents the second computing node from synchronizing the content repository; and
the computer readable medium further comprises instructions that direct one or more of the computing nodes to delete one or more objects from memory of the second computing node to increase available storage space and correct the error.

22. The computer readable medium of claim 19, further comprising instructions that direct one or more of the computing nodes to:
start a timer when the second computing node determines that the error is with the second computing node; and
direct the second computing node to transfer synchronization control of the content repository to the first computing node if the error is not corrected upon expiration of the timer.

23. The computer readable medium of claim 19, wherein:
the error is the network error that prevents the second computing node from communicating with the first computing node; and
the computer readable medium further comprises instructions that direct one or more of the computing nodes to reinitialize a network interface of the second computing node to correct the error.

24. The computer readable medium of claim 19, wherein:
the content repository is a Java Content Repository.

25. The computer readable medium of claim 19, the computer readable medium further comprises instructions that direct one or more of the computing nodes to:
detect the error of the second computing node via a Java Management Extension monitor.

* * * * *